United States Patent [19]

McEwen et al.

[11] Patent Number: 4,507,061
[45] Date of Patent: Mar. 26, 1985

[54] CHECK VALVE AND PUMP RECEPTOR ASSEMBLY

[75] Inventors: Stephen N. McEwen, Bowling Green; Ted W. Guelde, Deshler, both of Ohio

[73] Assignee: Henry Filters, Inc., Bowling Green, Ohio

[21] Appl. No.: 418,079

[22] Filed: Sep. 14, 1982

[51] Int. Cl.³ .................... F04B 35/04; G01F 11/32
[52] U.S. Cl. .................... 417/360; 417/424; 222/255; 222/333
[58] Field of Search ............ 417/360, 361, 424; 222/255, 265, 148, 333, 205; 251/148

[56] References Cited

U.S. PATENT DOCUMENTS

| | | | |
|---|---|---|---|
| 1,059,409 | 4/1913 | Thomas | 417/424 X |
| 2,756,017 | 7/1956 | Silverman | 251/148 |
| 2,877,792 | 3/1959 | Tybus | 137/512.1 |
| 2,978,988 | 4/1961 | McAlpine | 417/424 X |
| 3,093,269 | 6/1963 | Messer | 222/333 |
| 3,172,365 | 3/1965 | Nasvytis | 103/87 |
| 3,250,440 | 5/1966 | Trout | 222/255 |
| 3,452,778 | 7/1969 | Babcock | 137/512.1 |
| 3,538,946 | 11/1970 | Hilscheimer | 137/512.1 |
| 3,558,012 | 1/1971 | Weis | 417/360 X |
| 3,737,255 | 6/1973 | Emeny | 417/424 |
| 3,807,905 | 4/1974 | Pochyly | 417/360 |
| 3,825,120 | 7/1974 | Takahashi | 210/104 |
| 3,990,675 | 11/1976 | Bonafous | 251/148 |
| 3,995,328 | 12/1976 | Carolan et al. | 4/10 |
| 4,005,732 | 2/1977 | Buckner | 137/512.1 |
| 4,043,358 | 8/1977 | Sliski | 137/512.1 |
| 4,079,751 | 3/1978 | Partridge et al. | 137/516.29 |
| 4,159,543 | 7/1979 | Carpentier | 3/1.5 |
| 4,230,148 | 10/1980 | Ogle, Jr. | 137/512.1 |

*Primary Examiner*—Carlton R. Croyle
*Assistant Examiner*—Peter M. Cuomo
*Attorney, Agent, or Firm*—Hugh Adam Kirk

[57] ABSTRACT

A reservoir of liquid having a false bottom forming a lower chamber of reduced pressure produced by a plurality of removable pumps suspended in apertures in said false bottom, each of which apertures is provided with a two-piece receptor and check valve assembly; the receptor of which forms a guide and hydraulic slip-fit for the lower intake end of its pump and the other part below said receptor extends into said reduced pressure chamber comprises a cylindrical housing with a check valve at its lower end to close off that aperture to the reduced pressure chamber when its pump is not running or has been removed for repair.

10 Claims, 4 Drawing Figures

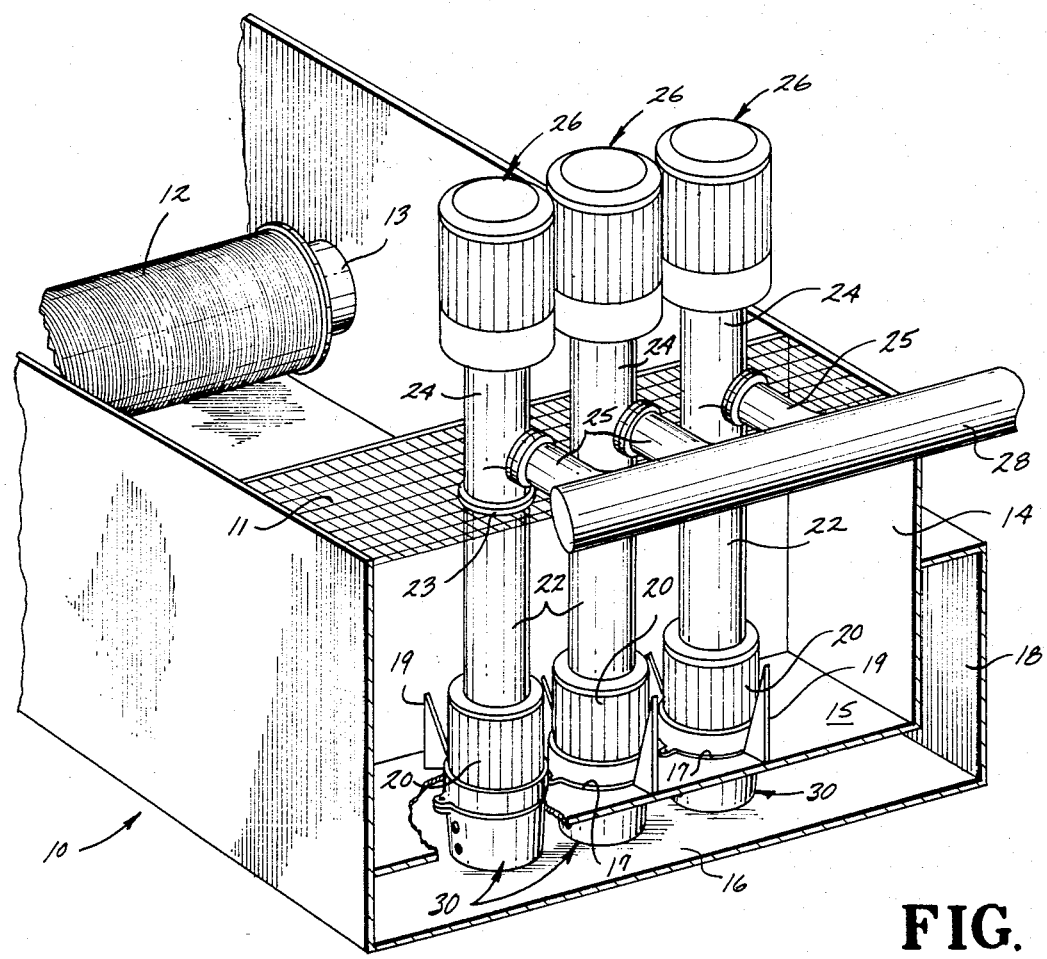
FIG. I
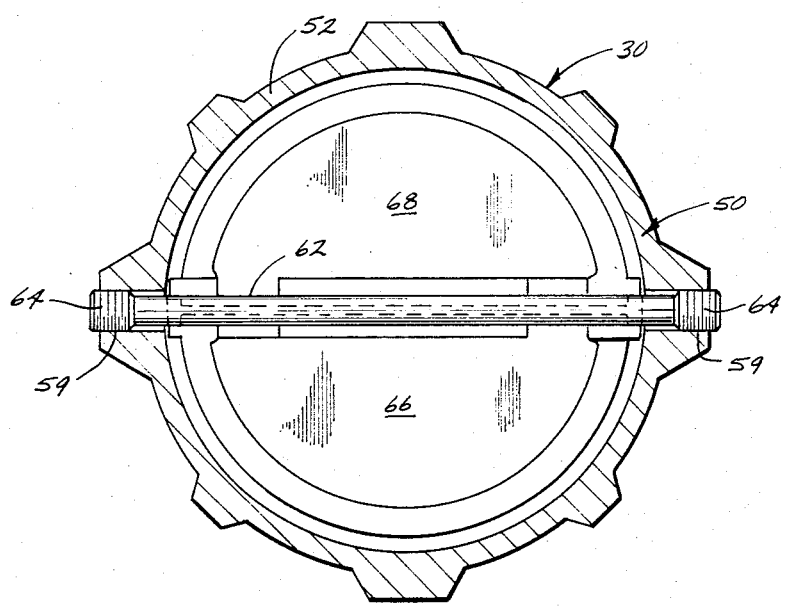
FIG. IV

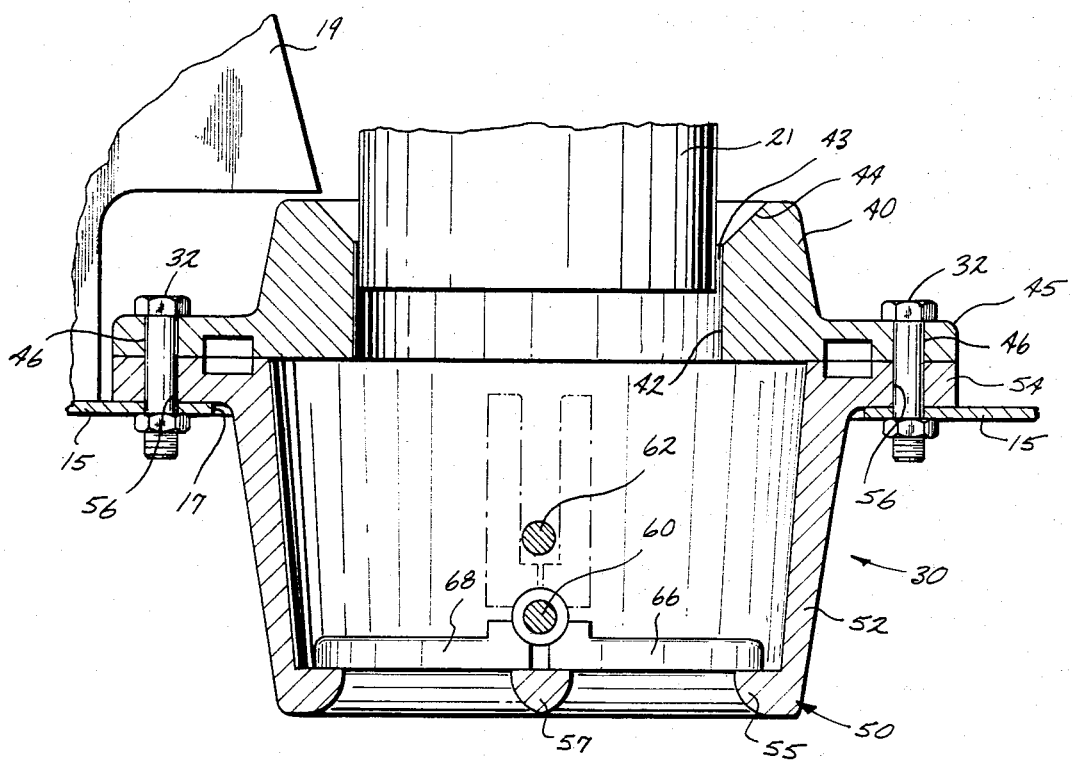
FIG. II
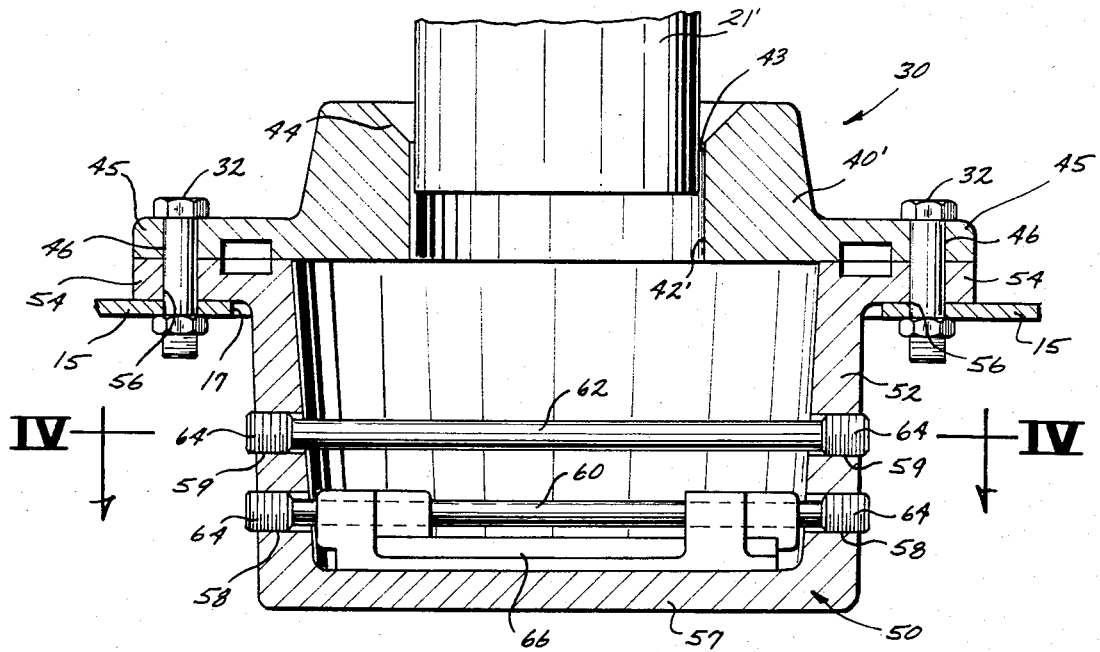
FIG. III

CHECK VALVE AND PUMP RECEPTOR ASSEMBLY

BACKGROUND OF THE INVENTION

Previously, settling tanks having suction filters for the separation of solid particles from liquid comprised turbine pumps hanging freely or suspended in vertical standpipes of liquid, the bottoms of which standpipes were connected to the suction chamber of the filter and the pumps were sealed to the top of their standpipes. However, if the seal leaked or if one of the pumps were to be removed, air would enter the suction chamber and intakes of the other pumps, causing cavitation unless the system were shut down. In order to avoid this, the lower depending inlet end of the pump was then sealed into an aperture in the suction chamber, but this was an expensive arrangement and the O-ring seal often became damaged, causing leakage. Also the system had to be shut down if a pump had to be removed for repair and maintenance, and during which time the aperture to the suction chamber needed to be plugged. Such a plug was particularly necessary if the suspended pump extended through the dirty liquid into the suction chamber containing clean liquid.

Thus, to avoid the requirement of a liquid-tight seal in the aperture to the suction chamber, the suction chamber was then placed beneath the clean tank so that in the event there were any leakage, such would not produce contamination, and the fitting between the intake end of the pump and the aperture in the clean tank could be an hydraulic slip-fit with a very narrow annular clearance between the aperture and the intake of the pump. Still, if the pump were to be removed, the system would have to be shut down and the aperture plugged, if the other pumps were to be operated.

SUMMARY OF THE INVENTION

Generally speaking, this invention comprises a two-piece receptor and check valve assembly, which pieces may be simultaneously fastened together and to an aperture in a chamber of reduced pressure, so that the intake of a pump may be slip-fitted into one piece and the other piece has a check valve to close the aperture when the pump is removed or nor operating.

More specifically, the assembly of this invention is employed for a plurality of pumps acting in parallel on a suction chamber in the bottom of a reservoir filled with the liquid to be withdrawn from the suction chamber by the pumps. Such a chamber with a plurality of such pumps, for example, may be employed in a settler-filter system for coolants or cutting oils for separating solid particles therefrom in which the suction chamber is directly connected to the outlet end of the filter and is located below the tank for the clean liquid. Since these tanks usually are quite large and the placement of pumps near the bottoms of these tanks submerges them in liquid, they must be removed for repair and maintenance.

Thus, this invention comprises a receptor having a machined internal cylindrical surface into which a similarly machined external cylindrical surface of the inlet duct of the pump closely slip-fits, guided at least in part by a bevelled edge at the upper end of the receptor's internal cylindrical surface. In addition, radially extending triangular guide ribs or vanes may be placed around and above the receptor for further guiding the lower depending intake end of the pump toward the internally bevelled upper end of the receptor. This receptor may also comprise an integral peripheral flange with equally angularly spaced apertures for bolts to fasten the receptor into the rim of the aperture in the suction chamber as well as to the second part containing the check valve. Thus, adaptors with different internal diameter cylindrical surface may be provided for connection with the different diameter pump inlet ducts and connected to the same check valve.

The lower check valve portion may comprise a substantially vertical cylindrical housing coaxial with the receptor and depending into the suction tank sufficiently to permit the pivoted semicircular gates or leaves of the check valve at its lower end to be raised from their lower rim seat without obstruction with the receptor when the pump is in operation and liquid is to be drawn from the suction tank into the pump. Stop means are provided to prevent either leaf or gate of the check valve from flopping over against or on top of the other leaf or gate, so that the check valve is maintained closed all the time suction is not applied to its receptor and aperture, whether its pump is stopped or has been removed for repair, maintenance, or replacement.

OBJECTS AND ADVANTAGES

Accordingly, it is an object of this invention to produce a simple, efficient, effective, economic, easily and quickly installed two-piece combination check valve and pump inlet receptor for an aperture in a suction chamber, whereby its pump may be stopped or removed without affecting the operation of one or more similar parallel pumps to the same suction chamber.

It is another object of this invention to produce a receptor in which the inlet end of one or more of a plurality of parallel suspended pumps may be easily removed without requiring a hermetic seal around its inlet duct and without contamination of the liquid in the tank, air leakage, or cavitation of the other parallelly connected pumps, or without the stopping or draining of the tanks in the system.

BRIEF DESCRIPTION OF THE VIEWS

The above mentioned and other features, objects and advantages, and a manner of attaining them are described more specifically below by reference to embodiments of this invention shown in the accompanying drawings, wherein:

FIG. 1 is a perspective view of an end of a settler-filter employing a plurality of suction pumps in its clean tank with parts of the tank being broken away to show the two-part pump inlet receptor and check valve assemblies of this invention;

FIG. II is an enlarged vertical sectional view of a preferred embodiment of a pump inlet receptor and check valve assembly with the intake end of the pump inlet duct shown therein, and the check valve open in dot/dash lines;

FIG. III is a vertical sectional view taken at right angles to the sectional view shown in FIG. II and showing a different size receptor part on the same check valve part of the assembly; and FIG. IV is a sectional view taken along line IV—IV of FIG. III showing the leaves of the check valve in their full lined closed position.

DETAILED DESCRIPTION OF A PREFERRED EMBODIMENT

Referring first to FIG. I there is shown a portion of a large settling tank 10 having submerged therein a rotatable drum-shaped filter 12 and at the forward end of the tank 10 is a clean liquid tank 14, the bottom wall 15 of which forms below it a suction chamber 16 connected directly with a suction duct 18 along one side of the tank 10 communicating with the outlet duct 13 of the drum filter 12. Located in the bottom 15 of the clean tank 14 or top of the suction chamber 16 are, herein shown, three similar apertures 17 which are aligned with three vertically suspended turbine-type pumps 20 supported by vertical ducts 22 having flanges 23 resting on the, herein shown, grid-type platform 11 over the open top of the clean tank 14. Extending above the pump supporting flanges 23 are tubular vertical extensions 24 of the ducts 22 for supporting the electric motors 26 for driving the submersible turbine pumps 20. Orthogonally from the ducts 24 are outlet ducts 25 connected to an outlet manifold duct 28 for the clean liquid that is drawn from the suction chamber 16 by the pumps 20. A plurality of parallel pumps are shown, because usually one is provided as a standby in the event one of the other two operative pumps needs to be repaired or replaced. Also, when the volume is low, only one of the pumps need be used. However, in the event of very high volume, all three pumps could be used, or more parallel pumps may be provided, as desired. In any event, however, never less than two pumps are employed in such a system, and thus it is advantageous to use the pump inlet receptor and check valve assembly 30 of this invention shown mounted in each of the apertures 17.

Referring now to FIGS. II, III and IV, there are shown details of two different embodiments of the combination receptor and check valve assembly 30 of this invention being removably attached by bolts 32 around the aperture 17 in the top plate 15 of the reduced pressure or suction chamber 16. This adaptor check valve assembly 30 comprises two separate cooperating parts, namely the receptor part 40 or 40' in FIG. III and the check valve part 50.

The receptor part 40 or 40' comprises essentially a central vertical internally machined cylindrical sleeve or aperture 42 or 42', into which the externally machined cylindrical inlet duct 21 or 21' of a pump 20 telescopically slip-fits with a very close easy tolerance or gap 43. Although this gap 43 may leak liquid, it is liquid from the clean tank, which is the same liquid that is being removed from the reduced pressure or suction chamber 16 into the clean tank, plus the fact that when any one of the pumps 20 is operating, the volume of liquid that is removed through its inlet duct 21 or 21' of the pump is many times greater than any liquid that could be sucked through the annular gap 43, namely less than 2% of the volume sucked through the inlet 21 or 21'. The upper open edge of the duct 42 or 42' is preferably bevelled at 44 for guiding the engagement of the lower end of the inlet duct 21 or 21'. Also, preferably and if desired, as shown in FIGS. I and II, there may be provided a plurality of three, four or more vertical triangular guide ribs or vanes 19 extending radially outwardly and upwardly and equally spaced around the receptors 40 for further guiding the lower end of the inlet duct 21 or 21' into the hydraulic slip-fit in the cylindrical opening 42 or 42' in the receptor parts 40 or 40', respectively. As shown herein, the receptor part 40 or 40' may be provided with an outwardly extending flange 45 which is provided with apertures or bolt holes 46 for the bolts 32 that anchor the receptor part 40 or 40' together with the check valve part 50 to the aperture 17 in the suction chamber 16.

Referring now to the lower or check valve part 50 of this invention, also shown in FIGS. II, III and IV, this part 50 comprises primarily a substantially vertical cylindrical housing portion 52 having at its lower end an inwardly extending rim 55 with a diametrically bisecting rib 57 to form two semicircular openings into the suction chamber 16. Parallel and above the diametrically rib 57 there are provided two pairs of aligned tapped holes 58 and 59 spaced vertically above the diametrical rib 57, each of which holes is provided with a diametrically extending bar or rod 60 and 62, respectively. These two rods 60 and 62 are held in place by set screws 64 threaded in each of the tapped openings 58 and 59. The lower rod 60 acts as an axle for the oscillatable semicircular check valve plates or leaves or gates 66 and 68, which gates 66 and 68 are free to raise from their full line horizontal valve closed position shown in FIG. II to their dot/dash line vertical valve open position as soon as suction is applied to its inlet duct 21 or 21'. The upper bar 62 is provided as a stop to prevent the leaves or semicircular hinged plates 66 and/or 68 from flopping one over on top of each other to maintain the one or the other of the semicircular apertures in the lower part of the housing 50 continuously open. Thus, when the pump associated with the check valve 50 is not operating or has been removed, the check valve plates or gates 66 and 68 close the semicircular openings to the suction tank chamber 16 and prevent any of the clean liquid in the tank 14 from circulating into the suction chamber 16 and/or prevent any reduction in the suction in the chamber 16 and thence through the duct 18 to the filter 12. Accordingly, any one of the pumps may be removed, replaced or stopped without requiring interruption of the settling filter system shown in FIG. I. The upper end of the housing 50 is provided herein with an outwardly extending flange 54 having a plurality of bolt holes aligned with the bolt holes 46 in the complementary flange 45 of the receptor part 40. Thus the bolts 32 not only simultaneously clamp the two parts 40 and 40' and 50 together, but also simultaneously anchor them to the plate 15 around the aperture 17 in the suction chamber 16. Furthermore, different size receptors 40, 40' corresponding to different diameter intake ducts 20, 21' for the pumps may be provided without having to completely change the whole assembly or the check valve part 50.

Another important feature and advantage of this invention is that the parts 40 or 40' and the housing 52 of the check valve part 50 may be cast to form integral pieces. Although a specific type of check valve of simple construction is shown herein, it is to be clearly understood that check valves of other constructions and features may be used in the lower part of the assembly 30 of this invention without departing from the scope thereof. Furthermore, it is to be understood that the two parts 40 or 40' and 50 may be connected together by other means than the bolts 32, or by bolts threaded directly into the housings of the parts instead of their complementary outwardly extending flanges 45 and 54 as shown.

While there is described above the principles of this invention in connection with specific apparatus, it is to be clearly understood that this description is made only by way of example and not as a limitation to the scope of this invention.

We claim:

1. A receptor check valve assembly for an inlet of a pump, comprising:
   (A) a chamber having a plurality of vertically open apertures associated therewith,
   (B) separate removable pumps each having an inlet vertically slideably associated with each said aperture for creating a reduced pressure in said chamber,
   (C) a receptor means for each said aperture for the inlet of its associated pump, said receptor means having
   (1) a slip-fit hydraulic telescopic connection with said inlet, and
   (2) a tapered guide means for said inlet outside said chamber to said telescopic connection,
   (D) a check valve means for each said aperture for maintaining said aperture closed when its associated pump is not operating, whereby fluid is prevented from passing through said aperture when another pump is operating to create a reduced pressure in said chamber, and
   (E) means for simultaneously connecting said receptor means and said check valve means together and to its associated aperture.

2. An assembly according to claim 1 wherein said chamber is connected to an outlet of a filter.

3. An assembly according to claim 1 wherein said chamber is in a tank of liquid that fills said chamber.

4. An assembly according to claim 1 wherein each said pump is a suspended submersible pump.

5. An assembly according to claim 1 wherein each said pump is driven by a motor remote from said chamber.

6. An assembly according to claim 1 wherein said receptor means comprises an outwardly flanged ring.

7. An assembly according to claim 1 wherein said telescopic connection comprises a cylindrical aperture in said receptor means and said tapered guide comprises a frusto-conical outwardly extending taper to said cylindrical aperture.

8. An assembly according to claim 1 wherein said check valve means has an outwardly extending flange.

9. An assembly according to claim 1 wherein said check valve means has a substantially cylindrical housing depending from said aperture.

10. An assembly according to claim 1 wherein said connecting means comprises bolts extending through said receptor means, said check valve means, and the rim of said aperture.

* * * * *